United States Patent [19]

Sollich

[11] 4,205,951
[45] Jun. 3, 1980

[54] STRAND-FORMING CONFECTIONARY ROLLER PRESS

[76] Inventor: Helmuth Sollich, Siemensstrasse 4, 4902 Bad Salzuflen, Fed. Rep. of Germany

[21] Appl. No.: 908,807

[22] Filed: May 24, 1978

[51] Int. Cl.² ............................................. A23G 3/12
[52] U.S. Cl. .................... 425/130; 264/146; 425/374; 426/517; 426/518
[58] Field of Search ................. 425/374, 363, 130

[56] References Cited

U.S. PATENT DOCUMENTS

| | | | |
|---|---|---|---|
| 806,923 | 12/1905 | Sandstrom | 425/374 |
| 846,790 | 3/1907 | Hueg | 425/374 |
| 1,782,301 | 11/1930 | Handle | 425/374 |
| 1,961,566 | 6/1934 | Mason | 425/374 |
| 2,909,131 | 10/1959 | Baur | 425/374 |
| 3,336,008 | 8/1967 | Zoethout | 425/374 |
| 3,491,403 | 1/1970 | Van Der Schee | 425/363 |
| 3,713,763 | 1/1973 | Harris | 425/363 |

FOREIGN PATENT DOCUMENTS 709087 8/1941 Fed. Rep. of Germany.

Primary Examiner—Murray Tillman
Assistant Examiner—Arthur H. Koeckert
Attorney, Agent, or Firm—Max Fogiel

[57] ABSTRACT

Apparatus for shaping strands of material used in confectionery production with a pair of rollers forming the bottom of a hopper for delivering material. The rollers are formed of smooth surfaces between which a gap has been left. In the gap a strand formation device adapting to the surface of the two rollers, has been inserted. The device is formed from a comb-like insert which, with its lateral boundary surfaces, conforms to the cylindrical surfaces of the two rollers. In the surface facing the intake roller there are grooves or passages 10 which run in the peripheral direction of the rollers and shape the composition into strands.

9 Claims, 8 Drawing Figures

STRAND-FORMING CONFECTIONARY ROLLER PRESS

BACKGROUND OF THE INVENTION

The invention relates to an apparatus for shaping compositions, used in the manufacture of confectionery, into strands of material, which apparatus is particularly suitable for processing all compositions which are plastic in the cold or hot state, such as marzipan, fondant, nut compositions, fruit compositions, fudge, caramel, aerated nougat, French nougat, coconut compositions and the like. German Patent Specifications Nos. 709,087 and 630,900 have already disclosed apparatuses for shaping pieces of confectionary, in which, in each case, a rotating pair of rollers forming the bottom of a material feed hopper is used, one roller being equipped with moulding recesses whilst the roller resting against it merely serves to force the composition into these moulding recesses. However, devices of this type are unsuitable for the production of strands of material because only very supple and soft compositions can be forced, without a break, from one side into the moulding recesses of one roller, whilst the subsequent release of the strands from the recesses is difficult in the case of numerous compositions, especially sugar compositions, and leads to a deformation of the strand profiles.

On the other hand, extruder presses with, as a rule, knurled pressure rollers are known, by means of which the compositions are forced into a small pressure chamber located underneath the rollers and are shaped into strands by being released from there through a die nozzle. In these presses, the disadvantages found are that the required high pressures cause fat to exude from the compositions, change the structure of the composition and compress aerated compositions.

Since the pressures cannot be distributed uniformly over the working width, unequal strands, and fluctuations in weight, result. Furthermore, only a limited effect on the temperature of the compositions is feasible, and the machine is difficult to clean, resulting in losses of material.

It is the object of the invention to eliminate these shortcomings and to provide an apparatus which makes it possible, in an extremely simple and clean manner, to form strands from a diversity of compositions and composition mixtures, which strands can subsequently be sub-divided into individual pieces, bars or the like and can be processed further. According to the invention, this is achieved by an arrangement wherein a gap is left between the two rollers which form the bottom of the material feed hopper, in which gap is inserted a strand-forming device which matches the periphery of both rollers.

SUMMARY OF THE INVENTION

According to the invention, one roller, acting as the intake roller, has a larger diameter than the other roller, both rollers have a smooth periphery, and the strand-forming device consists of a comb-like insert, which rests, by its lateral delimiting surfaces against the cylinder jacket surfaces of the two rollers and possesses, in the surface facing the intake roller, grooves which run in the peripheral direction of the rollers and shape the composition into strands. At the same time, the strand-forming device has points, prongs, teeth or the like which bridge the gap between the two rollers or project into this gap and which transfer the composition, supplied from the material feed hopper, into the grooves which form the individual strands of material.

According to the invention, the strand-forming device is replaceable by a similar device which produces different strand cross-sections, thus making it possible to produce a great diversity of shapes of material strands on the same apparatus merely by exchanging the strand-forming device. In addition, it is possible for both the rollers and the strand-forming device to be heatable or coolable, so that the apparatus can thereby be matched to the nature of the particular composition being processed, and so that shaping of the compositions and release of the strands of material can be assisted and facilitated. A further advantage of the invention results if the material feed hopper is sub-divided by a partition which extends into the gap, since this makes it possible to process different compositions simultaneously and combine them into a common strand of material. Furthermore, both the rollers and the strand-forming device can consist of a material, such as, for example, Tefon, metal or the like, to which the confectionery composition cannot adhere.

Further details of the invention are explained in the description which now follows. The inventive concept permits a great diversity of possible embodiments. One of these is described below with the aid of the attached drawings in which:

DESCRIPTION OF THE PREFERRED EMBODIMENTS

Figure 1:
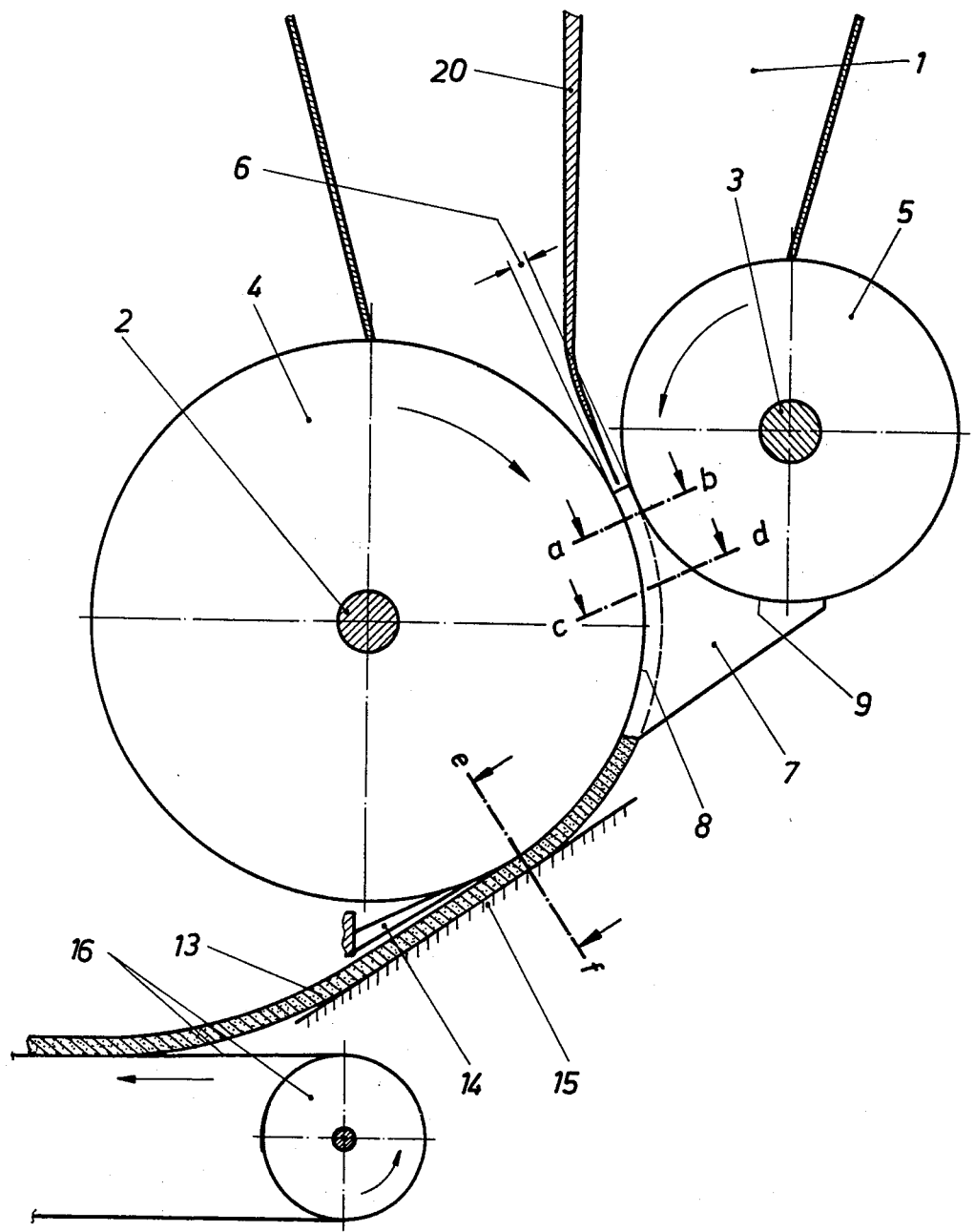
FIG. 1 shows a schematic representation, in side view, of an apparatus for shaping material strands.
Figure 2:
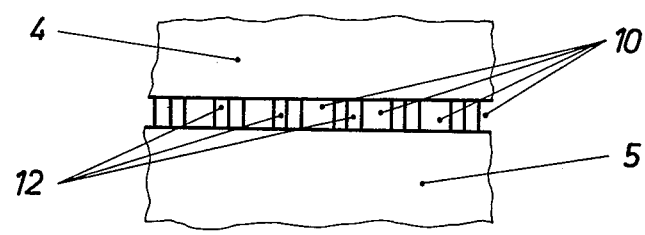
FIG. 2 shows a portion of a plan view onto the two cooperating rollers, viewed from the hopper.
Figure 3:
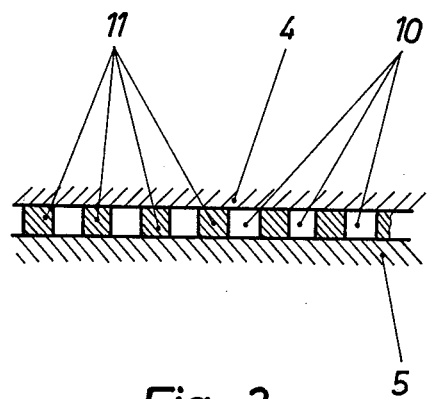
FIG. 3 shows a partial section along lines a–b through FIG. 1.
Figure 7:
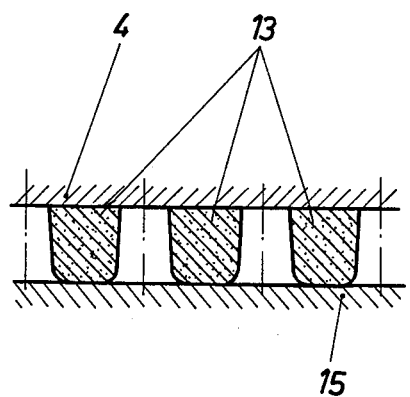
FIG. 7 shows a section along lines e–f through FIG. 1.
Figure 4:
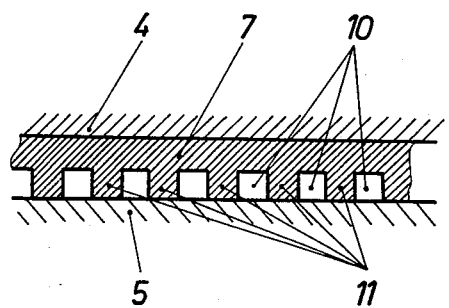
FIG. 4 shows a partial section along lines c–d through FIG. 1.
Figure 8:
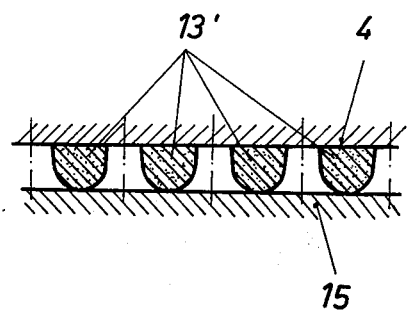
FIG. 8 shows a similar section to FIG. 7, when using a different insert.
Figure 5:
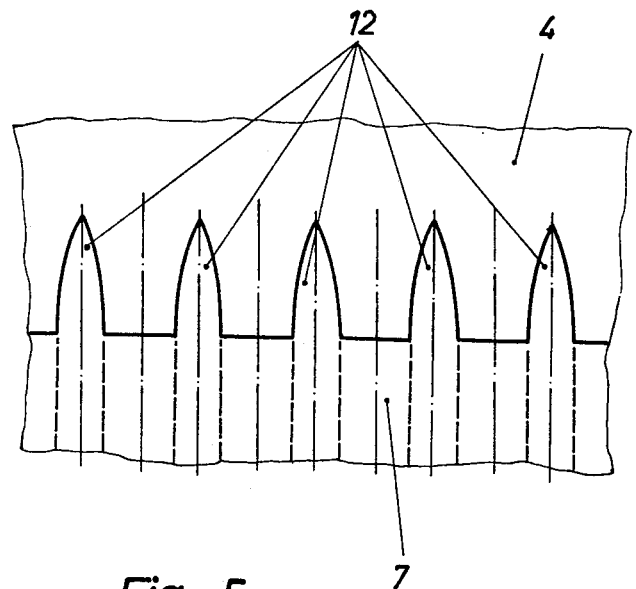
FIG. 5 shows a view of a part of the insert located between the rollers, viewed from the side of the smaller roller.
Figure 6:
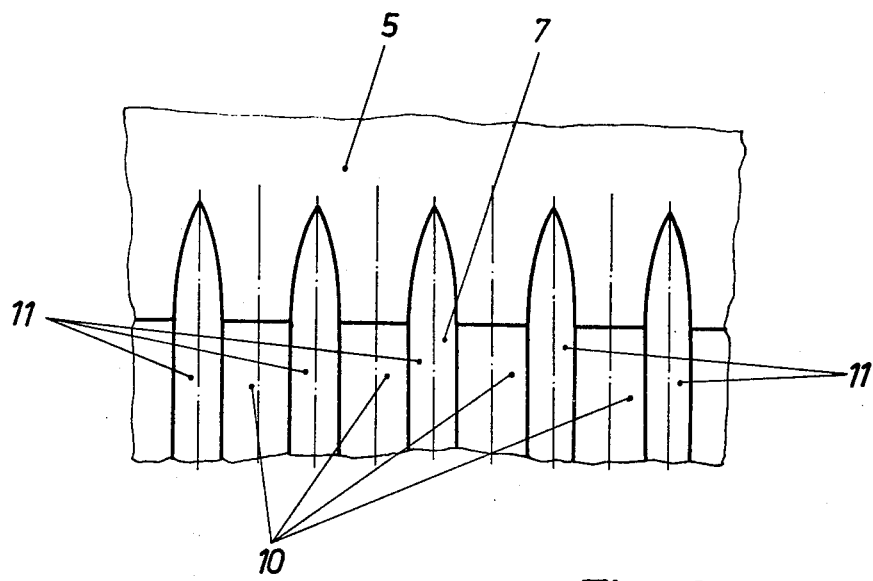
FIG. 6 shows a similar view to FIG. 5, from the side of the large roller.

The rollers 4 and 5 are mounted on axles 2 and 3, respectively, below a material feed hopper 1 and form the bottom of the hopper 1; the roller 4, acting as a so-called intake roller, has a larger diameter than the roller 5. Normally, both rollers have a smooth periphery. They counter-rotate in the direction of the arrows shown in the drawing, so that the composition is drawn out of the hopper 1 and is conveyed through between the rollers 4 and 5. On the other hand it is also possible to allow the rollers to rotate at identical or different speeds of revolution. Equally, the direction of rotation of one or other roller can be varied should the process of manufacture make this necessary.

In the embodiment of the apparatus shown in the drawing, a gap 6 has been left between the two rollers 4 and 5, and this gap is filled, over the entire length of the rollers, by a comb-like insert 7. This insert 7 in effect constitutes a strand-forming device and has contact surfaces 8 and 9 corresponding to the diameter of the rollers 4 and 5. The insert 7 completely bridges the gap between the two rollers 4 and 5. The arrangement is such that the surface 9 coming into contact with the roller 5 is smooth, whilst the contact surface 8, which faces the larger roller 4, is interrupted by longitudinal grooves 10 which leave, between them, comb-like portions 11 which terminate, at the top end of the insert 7, in points 12.

The strand-forming device 7 is of course interchangeable and its shape matches the shape of the particular rollers. It is inserted between the rollers from below but can, if necessary, also be inserted at the top of the rollers, that is to say from the direction of the hopper 1, provided this arrangement is taken into account by appropriate design of the insert and of the comb-like bars or points.

Furthermore, a so-called material divider 20 can be provided in the hopper 1, which divider makes it possible to feed a different composition to each roller, so that strands of material comprising several compositions can be formed.

As will be seen from the drawing, the insert 7 forms grooves 10 which run parallel to one another and along the periphery of the roller 4, so that the composition to be processed is forced through these grooves and is shaped into strands of material 13 which lie parallel to one another. These strands initially adhere to the periphery of the larger roller 4 and can be detached from there by a stripper 14 and transformed onto a shute 15 and subsequently, if appropriate, onto a conveyor belt 16.

The shape of cross-section of the grooves provided in the comb-like insert 7 determines the cross-section of the particular material strands produced. In this way it is possible, by interchanging the strand-forming device, to form a great diversity of strand cross-sections 13 or 13'. Of course it is also possible simultaneously to produce strands of material of different cross-section by using a suitable strand-forming device 7.

Finally it is also possible to subject the composition to a suitable temperature treatment on passing through the apparatus, by equipping the rollers 4 and 5 with means of heating or cooling accommodated in the interior. Furthermore, it is advantageous always to have one roller of substantially larger diameter cooperating with a smaller roller, with the grooves provided in the strand-forming device always facing the larger roller. In addition it is however also possible to heat or to cool the strand-forming device in order thereby to control the passage of material.

I claim:

1. Apparatus for shaping strands of material used in confectionary production comprising: a material feed hopper; a pair of rollers forming a bottom of said hopper; said pair of rollers having smooth surfaces with a gap in between, strand forming means adapted to said smooth surfaces and being inserted in said gap from the side of the pair of rollers facing away from the hopper, said strand forming means comprising a comb-shaped insert having lateral boundry surfaces conforming to cylindrical surfaces of said rollers, said comb-shaped insert having grooves in a surface facing an intake roller, said grooves extending in a peripheral direction of said rollers and forming material into strands.

2. Apparatus as defined in claim 1 wherein said intake roller has a larger diameter than the other roller in said pair of rollers.

3. Apparatus as defined in claim 1 wherein said strand-forming means has points, prongs and teeth for bridging said gap between said rollers for transferring said material into said grooves for forming said strands.

4. Apparatus as defined in claim 1 wherein said strand forming means is interchangeable with similar devices having other cross-sections of different strand profile.

5. Apparatus as defined in claim 1 wherein said strand forming means comprises a substance facilitating slippage and shaping of said material.

6. Apparatus as defined in claim 1 wherein said rollers and said strand forming means can be temperature-controlled and are enclosed in a system with controlled temperature.

7. Apparatus as defined in claim 1 wherein speed and direction of rotation of said rollers can be varied.

8. Apparatus as defined in claim 1 including a material divider leading towards said gap in said material feed hopper.

9. Apparatus as defined in claim 1 and wherein said intake roller has a larger diameter than the other roller in said pair of rollers; said strand-forming means having points, prongs and teeth for bridging said gap between said rollers for transferring said material into said grooves for forming said strands; said strand forming means being interchangeable with similar devices having other cross-sections of different strand profile; said strand forming means comprising a substance facilitating slippage and shaping of said material; said rollers and said strand forming means being temperature-controllable and being enclosed in a system with controlled temperature; said rollers having variable speed and direction of rotation; and material divider means leading towards said gap in said material feed hopper for feeding a different composition to each roller for forming strands of material comprising a plurality of compositions; said comb-shaped insert having portions terminating at a top end of said insert.

* * * * *